United States Patent [19]

Slater

[11] 4,307,396

[45] Dec. 22, 1981

[54] MICROPROCESSOR CONTROLLED PPI SWEEP GENERATOR WITH AUTOMATIC DISTRIBUTION OF REAL-TIME VIDEO AND SYNTHETIC DISPLAY LOADS

[75] Inventor: Eric K. Slater, Long Beach, Calif.

[73] Assignee: Hughes Aircraft Company, Culver City, Calif.

[21] Appl. No.: 139,047

[22] Filed: Apr. 10, 1980

Related U.S. Application Data

[63] Continuation of Ser. No. 973,414, Dec. 26, 1978, abandoned.

[51] Int. Cl.³ .................................................. G01S 7/22
[52] U.S. Cl. ............................... 343/5 EM; 343/5 DP
[58] Field of Search ......................... 343/5 DP, 5 EM

[56] References Cited

U.S. PATENT DOCUMENTS

| | | | |
|---|---|---|---|
| 3,134,974 | 5/1964 | Orenstein | 343/5 EM X |
| 3,543,269 | 11/1970 | Dudley | 343/5 EM |
| 3,789,403 | 1/1974 | Dalena et al. | 343/5 EM X |
| 4,126,858 | 11/1978 | Wiener | 343/5 EM |

Primary Examiner—T. H. Tubbesing
Attorney, Agent, or Firm—Walter J. Adam; W. H. MacAllister

[57] ABSTRACT

An improved method and apparatus for controlling the display of a plan position indicator radar display are disclosed which result in the elimination of both display flicker and the loss of critical real-time radar return data. The system is clocked by a series of fixed pulses related to the length of the radar beam on the display. Creation of the radar beam is given top system priority. Thereafter, the number of clock pulses allocated for radar beam creation is diminished as necessary to provide time for the display of prestored synthetic display data. The time is taken from a portion of each beam which has been preselected as least critical. Additionally, the beam length based clock pulses are employed to compensate for sweep overlap and in such functions as offset, range scale, and sweep off-scale.

13 Claims, 11 Drawing Figures

MICROPROCESSOR CONTROLLED PPI SWEEP GENERATOR WITH AUTOMATIC DISTRIBUTION OF REAL-TIME VIDEO AND SYNTHETIC DISPLAY LOADS

This is a continuation of application Ser. No. 973,414 filed Dec. 26, 1978, now abandoned.

BACKGROUND OF THE INVENTION

The present invention relates to radar displays, and more particularly, to methods and apparatus for controlling and time-sharing the creation of display data within a radar system.

Figure 1:
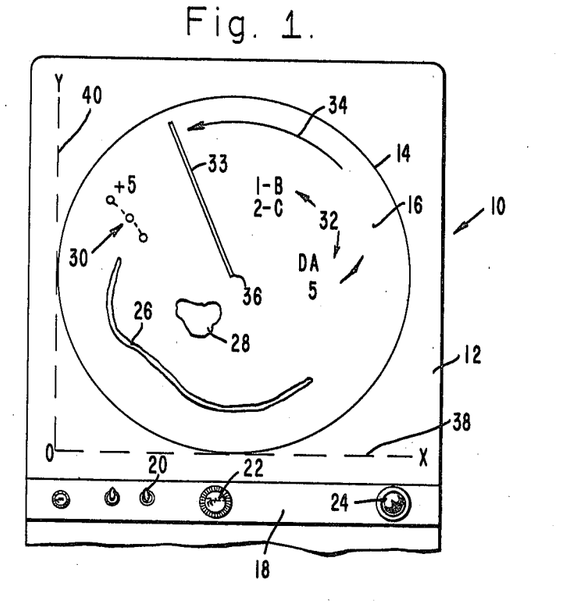
FIG. 1 is a simplified drawing of a PPI display as wherein the present invention is employed.

A radar display as wherein the present invention is employed is shown in FIG. 1 and generally indicated as 10. Radar display 10 comprises a cabinet 12 having a large cathode ray tube (CRT) 14 disposed with its face 16 positioned for operator viewing. Cabinet 12 is further provided with an input panel 18 having switches 20, knobs 22 and other input devices, for providing range and position data etc., such as track ball 24 internally connected to be sensed by control apparatus (not shown) all of which are well known and form no part of the present invention. The control apparatus includes computing logic and electronic circuits responsive to radar returns whereby a plurality of display indicia are created on the face 16 of CRT 14. The indicia created on the face 16 of CRT 14 fall into two groups—prestored or "synthetic" data and real-time data. The synthetic data is provided by the computer from many sources and includes items such as map portions 26, land masses 28, tracking data 30, and various alpha-numeric symbols 32 of meaning to an operator. The real-time data comprises the indication of a radar beam and its returns symbolized by a rotating beam 33 rotating as indicated by the arrow 34 about an origin 36. While the rotating radar beam display 33 appears to revolve about the origin 36, generally, it is created by use of Cartesian coordinates employing an X-Y beam deflection system with the CRT 14 itself. That is, the beam is "painted" with respect to an X-Y coordinate system as indicated by the dotted lines 38 and 40 representing the X-axis and Y-axis respectively.

The creation of the two types of display (synthetic and real-time) must be on a time-share basis. That is, the logic creating the display signals to the CRT 14 must work part of the time in creating the synthetic data and part of the time to create the radar beam 33. In the past, it has been the usual practice to create the synthetic data on a priority basis. That is, at a fixed repetitive rate, the logic first paints the synthetic data on the face 16 of CRT 14 and, thereafter, uses the remaining time until time to once again paint the synthetic data to paint the radar beam 33. Until recently, this did not create a severe problem as the amount of synthetic data was minimal. In recent developments of both civilian and military air traffic control as well as air defense systems, the increase in the amount of synthetic data has been significant such that the amount of time remaining to paint the radar beam is insufficient to assure that the beam is not partially created or missing radar returns.

Recognizing the necessity to display the real-time data which is missed if the beam is not present when the data occurs, many systems have attempted to reverse the priority. That is, the beam 33 is created first and the time remaining is employed in painting the synthetic data. Unfortunately, because of the vast amounts of synthetic data which must be refreshed, the time occupied in painting the entire quantity of synthetic data one time is such that the repetition or refresh rate falls below that required to prevent flicker. That is, between the time when a symbol such as tracking data 30 is painted one time and the time when it is repainted once again, the decay rate of the phosphors on the face 16 of CRT 14 which cause the viewable display is such as to be recognizable by an operator and appears as an objectionable flicker of the display on the face 16 of CRT 14.

Various techniques have been employed to surmount this problem. For example, "cycle stealing" is often employed. That is, some of the entire beams 33 are omitted and the time that would have been employed in creating the stolen beams is dedicated to painting the synthetic data. One form of cycle stealing is to steal a fixed beam position as, for example, stealing every tenth beam. Such cycle stealing is predicated on the proposition that every target "hit" by the radar is hit by a plurality of successive beams due to the beam width of the actual radar beam. Thus, if a single beam is "stolen", the target will be detected by at least one beam on either side of the "stolen" beam.

Another form of cycle stealing is "random" stealing. This form is predicated on the proposition that if portions of beams are randomly stolen in a total quantity as necessary to gain the required time, nothing will be taken from the same location so often as to cause lost data. For a low quantity of stolen segments of beams this may have some validity. But, as a number of beam segments necessary to provide the time becomes larger, the chance that the "random" beam segments will be bunched and repeat locations in successive steals becomes larger and the opportunity for lost data becomes greater.

Such techniques have been successful to some degree, but, at some point, the trade-off between the amount of synthetic data vis-a-vis the possibility of lost real-time data becomes such that the flicker problem and lost data problem cannot be solved simultaneously by presently known techniques. That is, the chance that data will be lost becomes too large to be tolerated and another scheme must be employed.

Moreover, the internal timing or "clock" techniques employed in prior art radar systems are such as to make the calculations employed in implemanting such a scheme cumbersome and time consuming in and of themselves.

Wherefore, it is the object of the present invention to provide a method and associated apparatus performing the method for operating a radar display which assures detection of critical real-time data while, at the same time, preventing undesirable flicker in the creation of synthetic data.

It is an additional object of the present invention to provide a method and associated apparatus for operating a radar display which incorporates a technique which makes any compensating calculations employed therein straightforward and simple thereby consuming a minimum of time in and of themselves.

SUMMARY

The foregoing objectives have been accomplished by the present invention in a radar plan position indicator display wherein synthetic data and real-time radar return beams rotating about an origin are displayed by display control circuitry on a time-shared basis by the method and associated apparatus for controlling the display creation to prevent both display flicker and lost critical real-time data which comprises apparatus for accomplishing the steps of: selecting the portion of the radar return closest to the origin of the actual radar beam as being either "most critical" or "least critical"; dividing the time to create the entire real-time radar beam length on the display into a fixed number (L) of equal clock pulses; initially allocating the creation of each radar beam on the display a time of said fixed number (L) of said clock pulses on a priority basis in which to create the beam display; using only the time not employed in creating the real-time radar beams displayed to create the synthetic data on the display; testing the amount of time required for creating the synthetic data on the display against the time remaining following that allocated for creation of the radar beams on the display and, if sufficient to allow creation of the synthetic data at a refresh rate above that required to prevent flicker, leaving the time in number of clock pulses allocated to create the radar beam on the display at its presently set value, otherwise, when the refresh rate of synthetic data is low enough to cause flicker, reducing the time in number of clock pulses allocated to create each real-time radar beam by a number which represents the added time necessary to refresh the synthetic data on the display at a non-flickering rate, the time being taken at the point of the radar beams selected directly or indirectly as "least critical"; and, repeating the foregoing steps as necessary in response to changes in designated system conditions.

To accomplish the additionally stated objective, the apparatus and its method additionally includes the steps of reducing the intensity of the real-time radar beam created by a decreasing a fixed amount for each of a fixed number of said clock pulses from the origin whereby the sweep pedestal is compensated near the origin for sweep overlap and reducing the intensity of the real-time radar beam allocated to a return indication a decreasing fixed amount for each of a fixed number of said clock pulses from the origin whereby the intensity of returns along the beam length is compensated for sweep overlap and is, therefore, uniform.

The beam length based clock pulses are also employed as the time base in various system functions such as "offset", "range-scale", and "sweep off-scale" to provide the simplification of calculations desired.

DESCRIPTION OF THE PREFERRED EMBODIMENT

Returning briefly to FIG. 1, radar displays according to the prior art employ two basic premises to their detriment. First, the internal timing clocks are a function of pure time. Thus, as range scales on the input panel 18 are changed, the number of clock pulses required to paint the radar beam 33 changes. At a different range setting, the length of the beam 33 represents a different total distance from the origin to the end of the beam in nautical miles. The longer the distance that the length of beam 33 represents, the slower the beam is painted since the beam 33 on the display 10 is in synchronization with the actual radar beam. Thus, more fixed length clock pulses are consumed. Second, any "stealing" (either fixed or random) of radar beams has been on an entire beam basis. That is, for fixed stealing the entire beam is stolen and in random stealing random portions along the entire beam are stolen. Thus, the entire beam length is treated as of equal importance.

The present invention is based on two premises entirely in contrast to the teachings of the prior art. First, the internal clock used in display calculations is based on the display and not the outside world of real-time. That is, the maximum length of a beam 33 on the face 16 of CRT 14 is fixed and, therefore, always represents a fixed number of clock pulses.

Second, the entire radar beam is not of equal importance. Depending on the particular situation at any time, objects closer to the origin or objects further from the origin are of greater importance. For example, in a commercial airport air traffic control system, traffic close adjacent the origin (the airport) is most important. By contrast, in a military early warning system, prompt detection of rapidly moving enemy missiles at a great distance is of prime importance so that counter measures can be quickly undertaken. Once the enemy has achieved the origin, it may be too late to mount an effective defensive counter-attack. Often, in air defense systems wherein a plurality of displays are in the same area and manned by a number of operators and simultaneously, the critical data point may fluctuate by operator and from minute to minute between long range data and short range data such that apparatus capable of easily switching from one to the other as "critical" would be highly desirable. Employing this premise, therefore, the present invention obtains the extra time necessary to refresh the synthetic data by removing part of the length of the beam 33 in the portion which is presently and changably selected as "non-critical". As will be seen in the description which follows hereinafter, the amount is both variable and automatic as set by the instantaneous requirements of the system.

Figure 2:
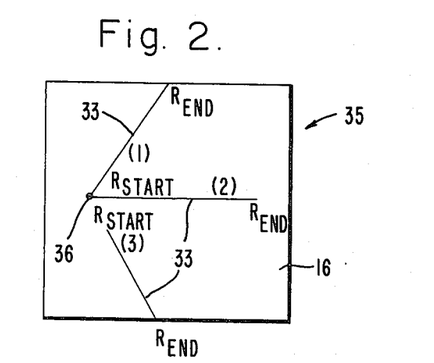
FIG. 2 is a simplified drawing of a radar display with the origin on the screen and indicating beams with no video interrupt (1), long-range video override (2), and short-range video override (3) respectively.
Figure 3:
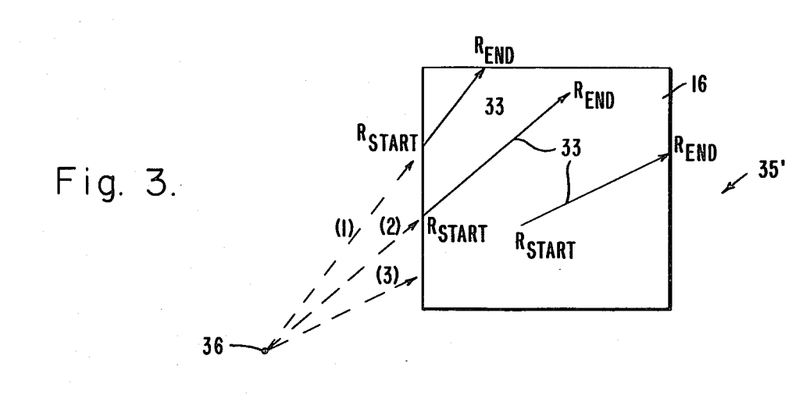
FIG. 3 is a simplified drawing of a radar display with the origin off the screen and, in the manner of FIG. 2, showing beams with no video interrupt (1), long-range video override (2), and short-range video override (3) respectively.

This concept can be understood with reference to FIGS. 2 and 3. In those Figures, a simplified radar display 35,35' is shown with the origin 36 on the face 16 and off the face 16 in FIGS. 2 and 3 respectively. In each figure, the beam labeled (1) extends completely across the face 16 from the origin 36 to the end of the beam marked $R_{END}$ and is designated as a "no video interrupt" beam. Note that in beam type (1) we are not saying that the beam 33 extends completely from the origin 36 to $R_{END}$. Rather, that portion of the beam 33 between the origin 36 and $R_{END}$ which appears on the face 16 is displayed. In the case of the origin 36 on the face 16 as shown in FIG. 2, the entire beam 33 is displayed. By contrast, where the origin 36 is off the screen, as in FIG. 3, only a portion of the beam is displayed. That portion of the beam between the origin 36 and the face 16 which is not displayed is, therefore, blanked and, correspondingly, any time which would have been necessary to paint the beam were it being displayed is available for other tasks such as painting synthetic display data. The point of the beam closest to the origin at which actual display on the face 16 begins is designated as $R_{START}$. Thus, in beam type (1) in FIG. 2, $R_{START}$ is at the origin 36. On the other hand, in FIG. 3, $R_{START}$ is that point on the face 16 where the "no video interrupt" beam 33 of beam type (1) first contacts face 16. As will be recognized, beam type (1) of FIG. 2 has a beam 33 longer than beam type (1) in FIG. 3. Thus, while both beams 33 are of the same type, that is, there is no video interrupt of the portion of the beam on the face 16, if the length of the beam 33 is a function of clock pulses related to the maximum length of the beam 33 on the face 16, fewer clock pulses will be required to paint the beam 33 of FIG. 3 than the beam 33 of FIG. 2 in beam type (1) and, therefore, more "spare" time will be available for the other tasks.

Beam type (2) of both FIGS. 2 and 3 displays what is referred to herein as "long-range video override". That is, the long-range or farthest end of the beam 33 is overridden (i.e. not displayed) and the time is transferred to other tasks. This is the case as previously described wherein the data closest to the origin 36 is of prime importance. By varying the position of $R_{END}$, the length of the beam 33 can be varied to produce "spare" time as necessary to do the other required tasks such as refreshing the synthetic data at a non-flickering rate.

Finally, beam type (3) of FIGS. 2 and 3 displays the "short-range video override" condition. That is, the data at a distance is of prime importance and that closest to the origin is of least importance. By varying the position of $R_{START}$ on the face 16, the length of the beam 33 can, in a manner similar to case 2, be modified to provide "spare" time as necessary.

Thus, as will be recognized by those skilled in the art, the key to the present invention is the use of range relative to display units as a single variable in controlling the various timed functions used to create the display. This is an important point of difference between the present invention and the prior art because the entire present invention is founded on this radical departure from the traditional approach to radar display timing control. Specifically, the range from the radar's origin to the point on the display where unblanking will occur is called $R_{START}$ and the range from the sweep origin to the point where blanking will occur is called $R_{END}$. These have been shown and described above with reference to FIGS. 2 and 3. Correspondingly, the units used in the sweep generator for $R_{START}$ and $R_{END}$ are called delta radius (DELTA R) clocks and are defined to be equal to one display element on the display. These clocks are obtained by appropriately dividing the radar range clock by the ratio of the console's current range switch setting to the shortest range selection available. Each DELTA R clock thus represents a fixed length on the display regardless of the range switch setting. As discussed above, this is the key of the present invention and is a radical departure from the teachings of the prior art.

Figure 4:
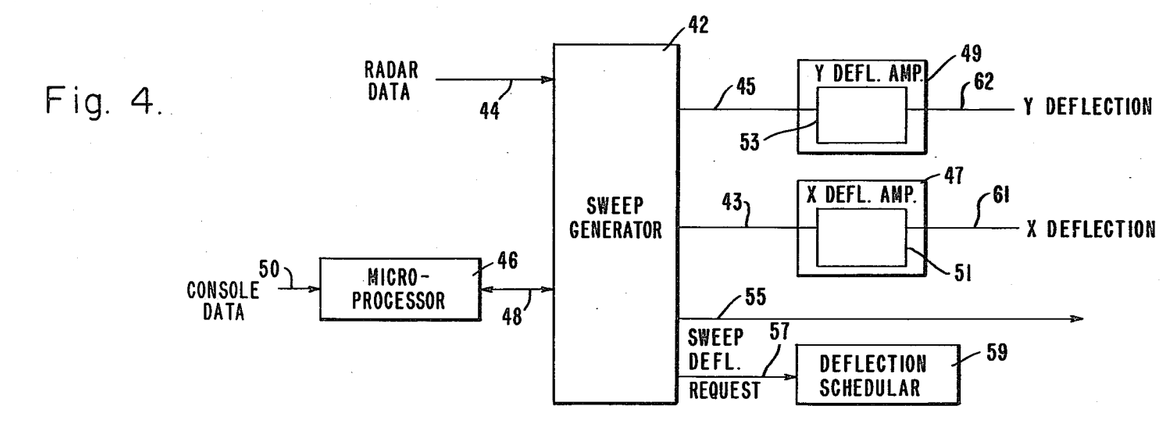
FIG. 4 is a block diagram of a sweep generator containing the elements required to generate real-time sweep position and control signals to a PPI display.

Referring briefly to FIG. 4, a sweep generator, generally indicated as 42, is shown containing the circuitry required to generate real-time sweep position and control signals to a PPI display deflection channel. The sweep generator 42 obtains radar timing signals (e.g. master trigger ($T_M$) and early trigger ($T_E$)) and antenna azimuth ($\theta$) signals from a radar interface through an input line 44 and makes this data available to a microprocessor (calculator) 46 through a two-way interchange line 48. The ranges for each display event are then pre-calculated one event in advance by the microprocessor 46 and returned to the sweep generator 42. In typical fashion, the outputs of the sweep generator 42 include: digital X and digital Y position data on lines 43 and 45, respectively, connected to X and Y deflection amplifiers 47,49 containing X and Y display digilogs 51,53; sweep pedestal intensity enable (or record enable for time compressed video to be discussed later herein) on line 55; and timing signals on line 57 to the deflection controller 59 to interweave the display of sweep with synthetic data. The X and Y deflection amplifiers 47,49 are, of course, connected by lines 61,62 to the X and Y deflection circuits (not shown), respectively. To provide the microprocessor 46 with the necessary parameters for it to accomplish its functions, data is input through input line 50 thereto from appropriate switches or the like on input panel 18. This parameter data includes console range, console offset, video override selection (long-range or short-range), and the synthetic data load (i.e. the time required to refresh the synthetic data at a non-flickering rate).

Figure 5A:
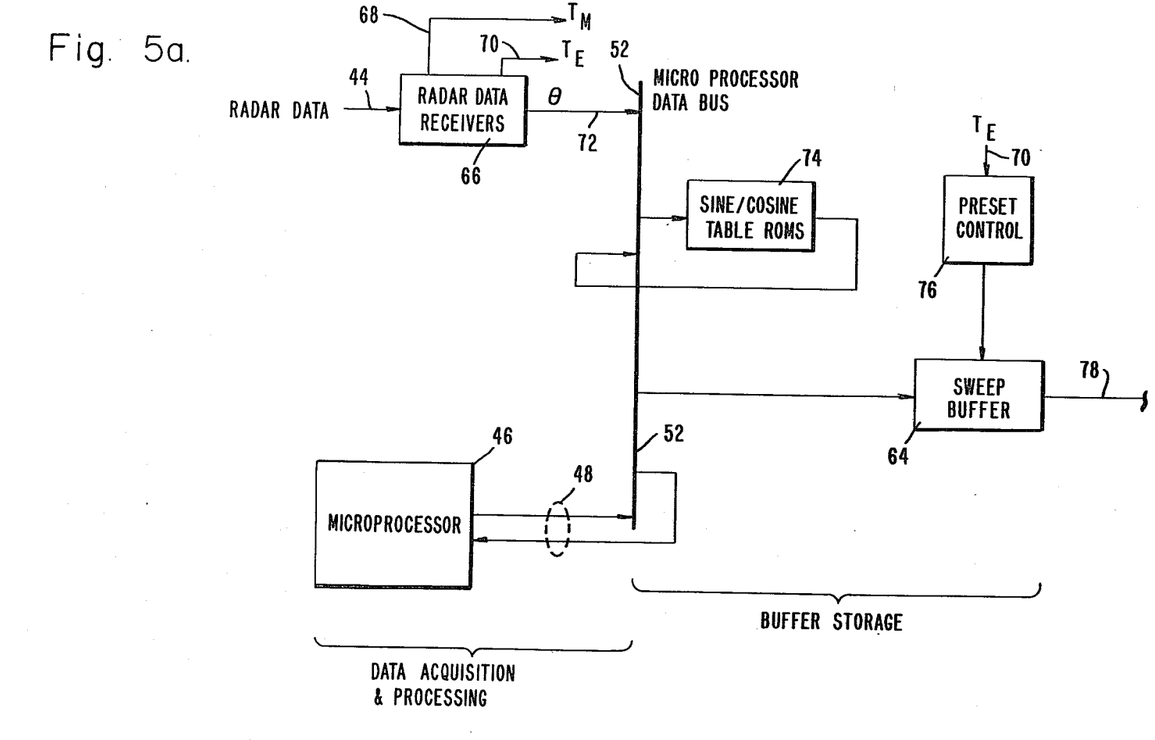
FIGS. 5a and 5b are a block diagram of the sweep generator design as employed in the present invention.
Figure 5B:
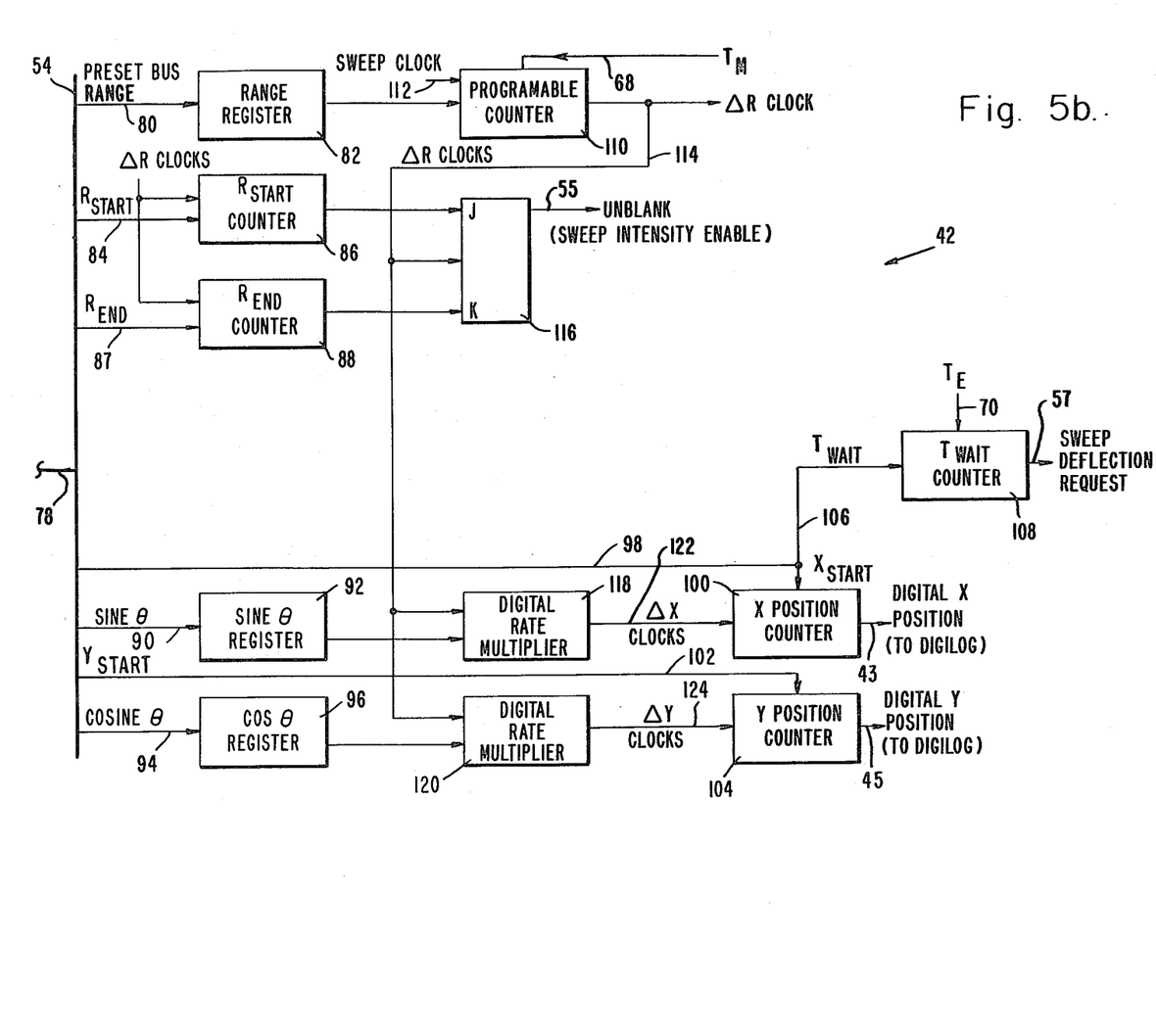

Referring now to FIG. 5, the sweep generator 42 is shown in expanded block diagram form. As can be seen, two data buses divide the sweep generator 42 into three major functional areas. The microprocessor data bus 52 interfaces the microprocessor (calculator) 46 to the sweep buffer 64 and to the radar data source 66. The master trigger ($T_M$) appears on line 68, the early trigger ($T_E$) appears on line 70, and azimuth ($\theta$) appears on line 72. As will be noted, only the azimuth ($\theta$) is connected to the microprocessor data bus 52. The other connections will be discussed hereinafter. Additionally, the microprocessor data bus 52 provides access to a sine/cosine table conveniently located in a read only memory (ROM) 74. In addition to being connected to the microprocessor data bus 52, the sweep buffer 64 is connected to a preset controller 76 which, in turn, has line 70 connected thereto upon which the early trigger ($T_E$) appears.

The preset bus 54 interfaces between the output line 78 of the sweep buffer 64 and the real-time control logic of the sweep generator 42. It feeds the precalculated values of RANGE, $R_{START}$, $R_{END}$, sine $\theta$, cosine $\theta$, $X_{START}$, $Y_{START}$, and $T_{WAIT}$ into the appropriate counters or registers. Specifically, RANGE is on line 80 and is connected to the Range Register 82; $R_{START}$ is on line 84 and is connected to the $R_{START}$ Counter 86; $R_{END}$ is on line 87 and is connected to the $R_{END}$ Counter 88; sine $\theta$ is on line 90 and is connected to the SIN $\theta$ Register 92; cosine $\theta$ is on line 94 is connected to the COS $\theta$ Register 96; $X_{START}$ is on line 98 and is connected to the X Position Counter 100; $Y_{START}$ is on line 102 and is connected to the Y Position Counter 104; and $T_{WAIT}$ is on line 106 and is connected to the $T_{WAIT}$ Counter 108. These functions will be discussed hereinafter in greater detail in relation to the specific equations performed by apparatus accomplishing the method of the present invention.

Note with continuing reference to FIGS. 5a and 5b the output of the range register 82 is connected as an input to a programmable counter 110, as is the master trigger ($T_M$) on line 68 and the sweep clock appearing on line 112. Using these input variables, programmable counter 110 produces the DELTA R ($\Delta R$) clock pulses on the output line 114 thereof. Line 114 with its DELTA R clock pulses is connected as the timing input at various functions throughout the system. In particular, it appears along with the outputs of the $R_{START}$ Counter 86 and the $R_{END}$ Counter 88 as an input to the Unblank Flip Flop 116 the output of which is connected to the unblank circuit (not shown) of the display CRT 14. In similar manner, it appears as an input to a pair of digital rate multipliers 118,120 along with the outputs of the SIN $\theta$ and COS $\theta$ Registers 92,96, respectively, to provide DELTA X and DELTA Y clock pulses on the respective output lines 122,124 thereof. As can be seen, the lines 122,124 are connected respectively to the X Position and Y Position Counters 100,104. As previously discussed with reference to FIG. 4, the outputs of counters 100 and 104 are lines 43 and 45 which are connected to provide the digital X position and digital Y position to the X and Y Deflection Amplifiers 47,49. Likewise, the output of the $T_{WAIT}$ Counter 108 is line 57 which provides the sweep deflection request to the Deflection Scheduler 59.

Figure 6:
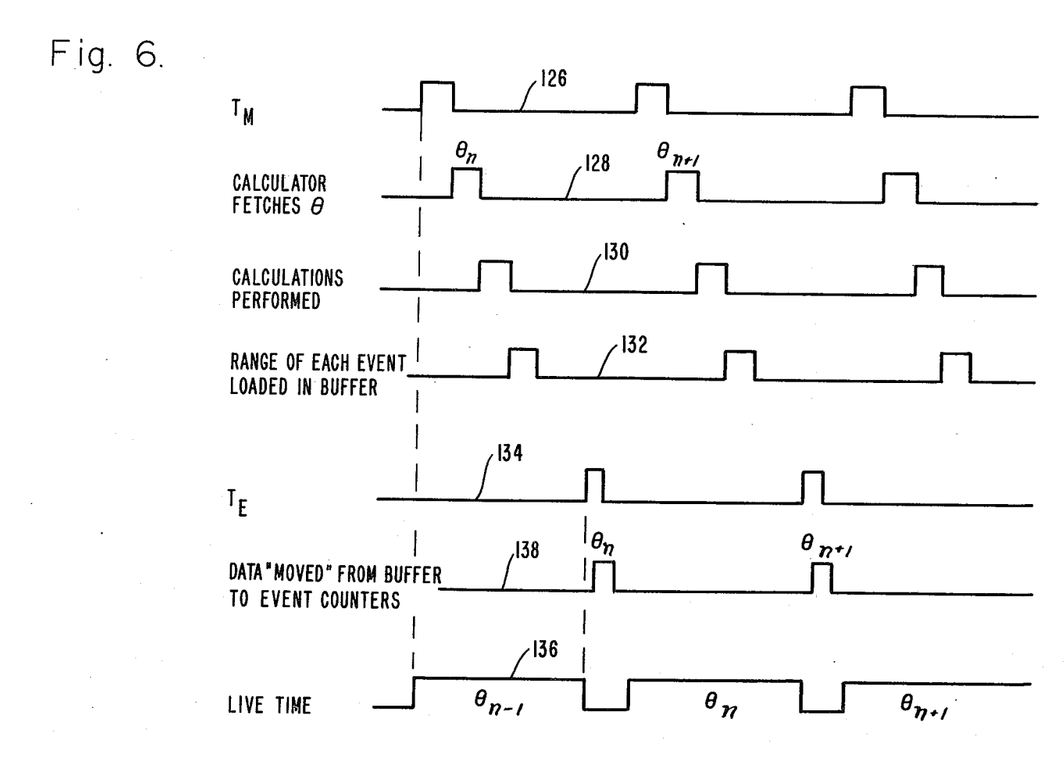
FIG. 6 is a timing diagram showing the timing for the sweep generator operation.

Referring momentarily to FIG. 6, the timing is shown for the operation of sweep generator 42 just described in its block diagram form. The master trigger ($T_M$) is shown on timing line 126. Immediately after a master trigger ($T_M$) is obtained, the microprocessor 46 fetches the azimuth ($\theta$) for the next radar beam, as indicated by the timing pulses on line 128, and performs the calculations to be described hereinafter for the sweep at the following $\theta$, as indicated by timing line 130. The calculated parameters are loaded into the sweep buffer 64 following the calculation thereof, as indicated by timing line 132. When the next early trigger ($T_E$) is received, as indicated by timing line 134, live time is ended (if not already ended), as indicated by timing line 136, and the sweep generator 42 loads each event register or counter, as previously described above, from the buffer 64, as indicated by the timing line 138. When the next master trigger ($T_M$) occurs, the event counters begin counting delta radius (DELTA R) clocks to control the display as a function thereof.

Figure 7:
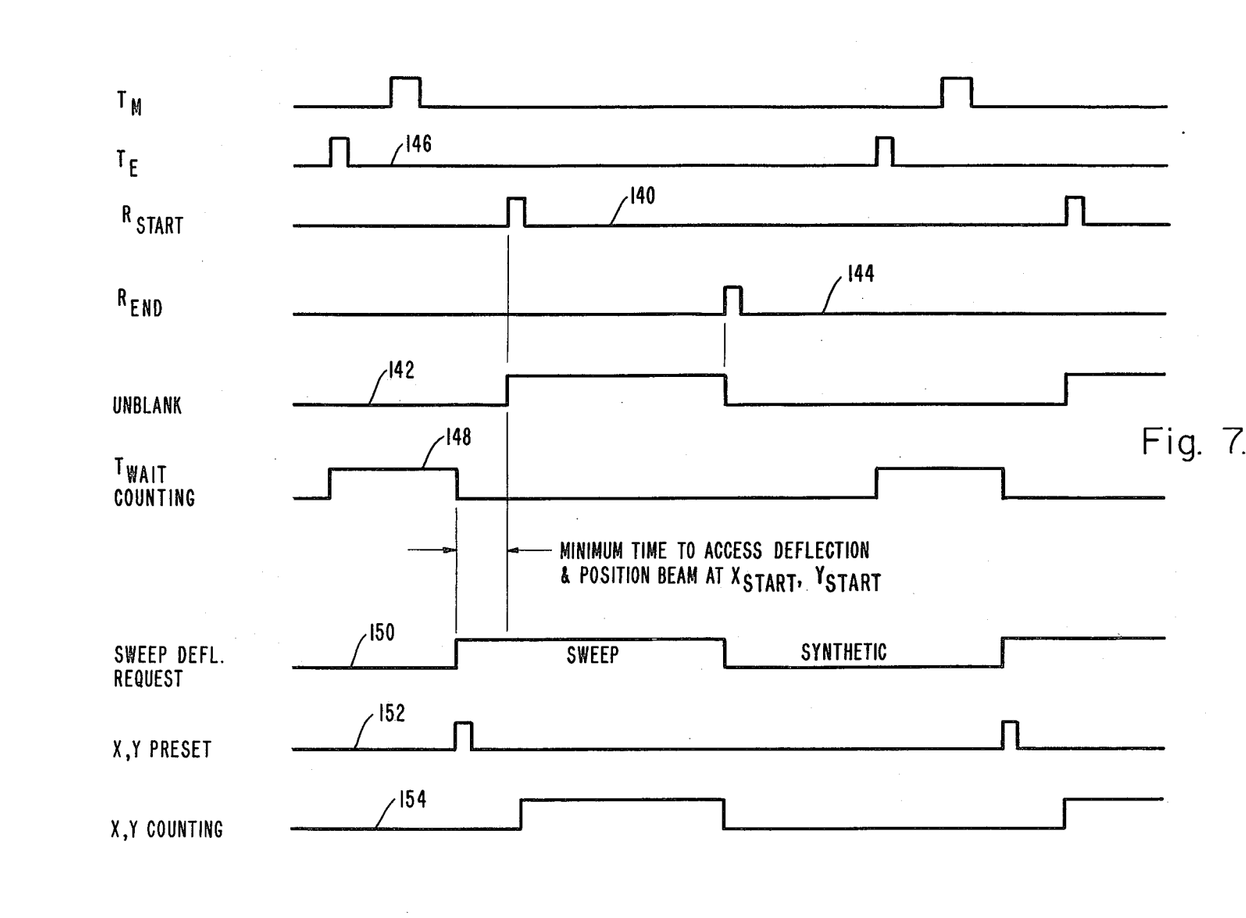
FIG. 7 is a timing diagram showing typical display timing.

Typical display timing for a display sequence is shown in FIG. 7. As previously mentioned, the DELTA R clocks are generated by dividing the sweep clock appearing on line 112 into the programmable counter 110 by an appropriate amount so that, regardless of the console range switch selection, one DELTA R clock is a fixed distance on the PPI. These clocks are used by the $R_{START}$ counter 86, which is preset with a function of $R_{START}$, and signals unblank start when the preset is exhausted, as indicated by timing lines 140 and 142. Similarly, blank start is keyed from the $R_{END}$ counter 88, as indicated by timing line 144. The $T_{WAIT}$ counter 108 is also loaded at the early trigger time ($T_E$) with a value calculated by the microprocessor 46 (see timing lines 146 and 148), and begins counting fixed frequency clocks. When the $T_{WAIT}$ counter 108 is exhausted, the deflection control function is signaled with a sweep request, as indicated by timing line 150. As previously discussed with respect to the timing diagram of FIG. 6, the X and Y deflection channels are preset with the $X_{START}$ and $Y_{START}$ display values (see timing line 152), so that when unblank occurs, the beam will be at the $X_{START}$, $Y_{START}$ position. When unblank occurs, the X and Y position counters 100,104 begin counting the DELTA X and DELTA Y clocks produced by the digital rate multipliers 118,120, as indicated by timing line 154. Note that the time between the end of $T_{WAIT}$ time on timing line 148 and unblank as indicated on timing line 142 must be at least equal to the minimum time to access the deflection system and position the beam at the ($X_{START}, Y_{START}$) starting position or the beam will not be painted properly from the correct starting position.

The DELTA R clocks are also utilized conveniently in generating sweep intensity and pedestal corrections. This phenomenon and the solution provided by the present invention can best be understood with reference to FIG. 9. As shown therein, two sequential beams ($B_i$ and $B_{i+1}$) 33 overlap for a portion as indicated by the cross-hatched area 56. The result is that the intensity of the beam 33 in each case is brighter in the overlap area 56 because the phosphors on the face 16 of CRT 14 are subjected to increased illumination energy. It is desirable that each individual beam 33 be substantially constant over the length thereof independent of this overlap so that near-origin displays do not predominate the display. This effect is two-fold. That is, the beam pedestal or basic illumination of the beam is effected as is any return superimposed thereon. A return displayed within the beam overlap area is brighter in intensity than the display should be and could, therefore, possibly indicate a target of larger size than in actuality. Thus, it is desirable to compensate both pedestal and response patterns for beam overlap. Either, however, could be compensated individually without compensating the other. Acording to the prior art, complicated calculations are necessary since the beam, and corresondingly the overlap area, is a function of actual time. In the present invention, however, each beam 33 comprises a fixed number of DELTA R clock pulses as indicated. Thus, the overlap area 56 always comprises a fixed number of DELTA R clock pulses. Correspondingly, the beam overlap area 56 can be calculated in fixed increments of correction necessary corresponding to each DELTA R clock position from the origin 36 as indicated by the blocks 58. Having once calculated the individual fixed intensity compensation required for each fixed block 58 of beam overlap area 56, these values can be stored in a ROM and accessed in fixed steps of DELTA R time pulses of the beam from the origin whereby the beam is decreased in intensity in decreasingly fixed steps from the origin until the end of the beam overlap area 56 is reached. Thus, the complicated calculations of the prior art are replaced in the present invention by a simple counting sequence of DELTA R clock pulses from the origin and sequential access to prestored fixed values contained in a ROM are then applied in sequence to the appropriate intensity drivers of the video by an appropriate circuit such as that shown in FIG. 8.

Figure 8:
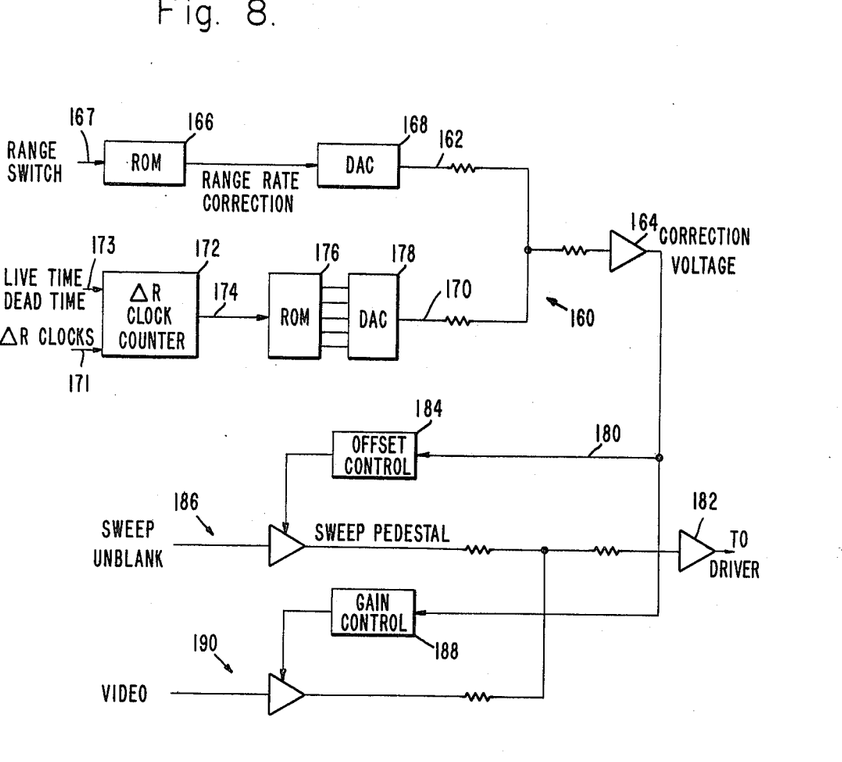
FIG. 8 is a block diagram of correction circuitry employed in the present invention.
Figure 9:
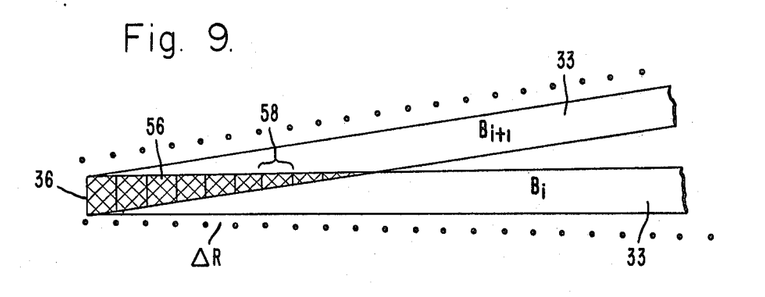
FIG. 9 is an expanded view of two beams on a PPI display showing beam overlap.

FIG. 8 shows a block diagram of correction circuitry which can be implemented to easily perform the functions just described. The top portion 160 shows the generation of one correction voltage, which is the summation of a range rate correction which is obtained by accessing a range rate correction read only memory (ROM) 166 as a function of the range switch setting value input on line 167 and then converting the digital value thus obtained to an equivalent voltage by inputting it to the a digital to analogue converter (DAC) 168 summed with a digital overlap correction voltage. This novel correction is derived directly by counting the fixed displacement DELTA R clocks input on line 171 with a counter 172 as a function of live time as input on line 173. The output of counter 172 represents the distance the sweep currently extends from the sweep origin in display increments. This value is made available to another read only memory 176 which is loaded with a sweep overlap correction curve. The values from this ROM 176 are fed to another DAC 178 to provide an equivalent voltage, as described above, and the output of DAC 178 is applied to a lead 170 and summed with the range rate value in summing amplifier 164 to develop the composite correction voltage on output line 180. Line 180 is connected in the bottom portion to the offset controller 184 and the gain controller 188 of the sweep pedestal generator 186 and video return generator 190, respectively, which, in turn, are connected to control the video drive amplifier 182. As a result of this circuit and the method it implements, a flat field intensity pattern is created on the PPI.

SWEEP CALCULATIONS

The following are the actual calculations which are performed by the apparatus previously described in accomplishing sweep generation according to the techniques of the present invention.

Figure 10:
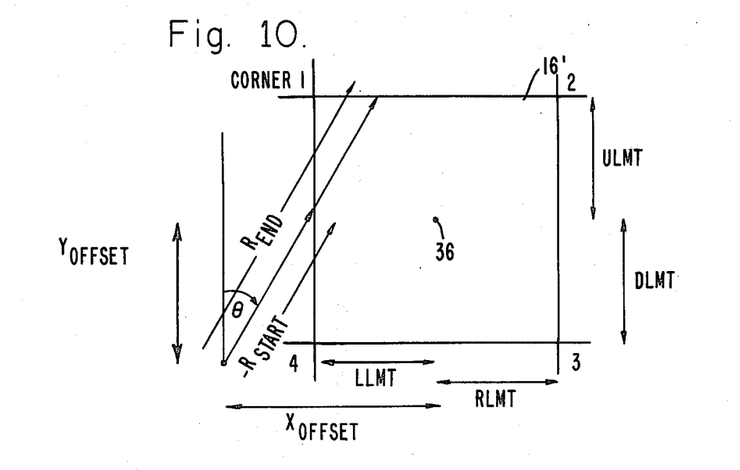
FIG. 10 is a simplified view of a PPI display screen indicating the variables employed in the calculations employed in implementing the present invention according to its preferred embodiment.

To best understand the calculations, refer to FIG. 10 for examples of the terms employed therein. Throughout, all values except as noted are in DELTA R units. As will be remembered, the radar beam revolves about the origin 36 but is created by the use of an X-Y deflection system with reference to an imaginary set of X and Y axes 38 and 40. The distance to the origin 36 of the display from the X-Y origin along the X axis is designated X OFFSET and the corresponding distance along the Y axis is designated as Y OFFSET. $R_{START}$ and $R_{END}$ have been discussed in detail previously. ULMT and DLMT represent the distance up and down from the display origin 36 to the top and bottom of the display and, correspondingly, LLMT and RLMT represent the distances left and right, respectively, to the left side and right side of the display. These distances are important as will be seen with reference to the calculations which follow since worst case is always used to assure non-flicker whereby any lesser case is sure not to flicker.

It should be remembered that in the present system the values for each beam generation are calculated during the preceeding beam. As a function of time needed to reduce flicker, the precalculated value is modified prior to the time it is needed. When actually passed to the beam generation circuitry described above, the calculated and (as necessary) modified values are those required to properly display the critical portion of each beam while assuring sufficient time to refresh the synthetic data at a non-flickering rate.

CALCULATIONS PERFORMED ONCE PER REFRESH FRAME

Generally, these calculations are performed once per display refresh frame (or alternately once per radar revolution). The purpose is to calculate the ratio (n) between the time available for radar video display (RTA) to the time required for radar video display (RTR). When this ratio is one or greater, indicating that there is enough or more than enough time to perform the indicated tasks, no video interrupt is necessary. When it is less than one, video interrupt must be utilized to maintain the synthetic display at the desired refresh rate.

Time Required for Radar Video Display (RTR)

$$RTR = \frac{PRF}{DFR} \cdot \frac{N-1}{N} \left[ \frac{MAX}{\theta} (R_{END} - R_{START}) \times RANGE \times \frac{CTM}{RLMT} + STP \right]$$

Where:

$\frac{MAX}{\theta} (R_{END} - R_{START})$ = The maximum value for the preceeding beam revolution over azimuth $\theta$ of $R_{END} - R_{START}$ (i.e. worst case beam length)

STP = Set-up time for Sweep Deflection
RTR = Radar time required
PRF = Radar Pulse Repetition frequency
DFR = Display Frame Rate
N = Number of uninterrupted sweeps before an entire sweep line is stolen
RANGE = Console Range Selected
CTM = Time for Radar signal to travel and return 1 mile
RLMT = Distance from center to edge of display in DELTA R clocks
$\theta$ = Rotation angle of radar antenna Time Available for Radar Video Display (RTA)

RTA = 1/DFR-SYNTHETIC DATA DISPLAY TIME/FRAME

Ratio between RTA and RTR n = RTA/RTR when n ≦ 1; if RTA/RTR > 1, let n = 1.

CALCULATIONS PERFORMED AT EACH MASTER TRIGGER

At each master trigger ($T_M$), the microprocessor 46 fetches the antenna azimuth ($\theta$) from the receivers on the sweep generator 42. An estimate is then made of the azimuth to be attained by the radar antenna at the next master trigger by adding to the current azimuth the average azimuth change per master trigger and then updating the average change. The calculations which are performed are based upon this calculated azimuth and upon the display window size and offset. The results (directly loadable presets for the event counters on the sweep generator) are loaded into the buffer memory 64 in the sweep generator 42. At the end of live time, these presets are loaded into the individual counters to control the events.

The calculations solve for the sweep intercept ranges to the beginning and end of the display window, the X,Y sweep start point, and the delay time from early trigger ($T_E$) to sweep deflection request. These parameters are called $R_{START}$, $R_{END}$, $X_{START}$, $Y_{START}$, and $T_{WAIT}$, and are described below.

A. $R_{START}$ Calculations

The calculations for $R_{START}$ take different forms depending upon where the sweep origin is with respect to the PPI display area. If the origin is on screen, $R_{START}$ is zero. If it is off screen, the value is the greatest of the ranges to the first X or Y interrupt.

| | |
|---|---|
| Origin on display; $R_{START} = 0$ | a. |
| Origin off display, top; $R_{START} = \dfrac{\|YO + ULMT\|}{\|COS\ \theta\|}$ | b. |
| Origin off display, bottom; $R_{START} = \dfrac{\|YO - DLMT\|}{\|COS\ \theta\|}$ | c. |
| Origin off display, right; $R_{START} = \dfrac{\|XO + RLMT\|}{\|SIN\ \theta\|}$ | d. |
| Origin off display, left; $R_{START} = \dfrac{\|XO + LLMT\|}{\|SIN\ \theta\|}$ | e. |
| Origin off display, in corners, take the largest of: | f. |

$R_{START1}$ = X INTERCEPT $R_{START2}$ = Y INTERCEPT

| Corner | X INTERCEPT | Y INTERCEPT |
|---|---|---|
| 1 | $\|XO - LLMT\|/\|SIN\ \theta\|$ | $\|YO + ULMT\|/\|COS\ \theta\|$ |
| 2 | $\|XO + RLMT\|/\|SIN\ \theta\|$ | $\|YO + ULMT\|/\|COS\ \theta\|$ |
| 3 | $\|XO + RLMT\|/\|SIN\ \theta\|$ | $\|YO - DLMT\|/\|COS\ \theta\|$ |
| 4 | $\|XO - LLMT\|/\|SIN\ \theta\|$ | $\|YO - DLMT\|/\|COS\ \theta\|$ |

The corners are those indicated in FIG. 10.

B. $R_{END}$ Calculations a. Origin is on the display or at the corners, take the lesser of X intercept, Y intercept, or Radar Range Maximum.

| Origin | X INTERCEPT | Y INTERCEPT |
|---|---|---|
| Corner 1 or $\pi/2 < \theta \leq \pi$ | $\|XO + RLMT\|/\|SIN\ \theta\|$ | $\|YO - DLMT\|/\|COS\ \theta\|$ |
| Corner 2 or $\pi < \theta < 3\pi/2$ | $\|XO - LLMT\|/\|SIN\ \theta\|$ | $\|YO - DLMT\|/\|COS\ \theta\|$ |
| Corner 3 or $3\pi/2 < \theta \leq 2\pi$ | $\|XO - LLMT\|/\|SIN\ \theta\|$ | $\|YO + ULMT\|/\|COS\ \theta\|$ |
| Corner 4 or $0 < \theta \leq \pi/2$ | $\|XO + RLMT\|/\|SIN\ \theta\|$ | $\|YO + ULMT\|/\|COS\ \theta\|$ | b. Origin off display, to left;

$$R_{END} = |XO + RLMT|/|SIN\ \theta|$$

c. Origin off display, to right;

$$R_{END} = |XO - LLMT|/|SIN\ \theta|$$

d. Origin off display, at top;

$$R_{END} = |YO - DLMT|/|COS\ \theta|$$

e. Origin off display at bottom;

$$R_{END} = |YO + ULMT|/|COS\ \theta|$$

C. $R_{END} - R_{START}$ Calculations

Calculate $(R_{END} - R_{START})$. If this result is negative or zero, blank display.

Keep a running value of:

$(MAX/\theta)(R_{END} - R_{START})$ and $(MIN/\theta)(RSTART)$ per radar antenna revolution. Where these values are of the form as previously described above with relation to the calculation of RTR.

D. Video Override Calculations

These calculations adjust $R_{END}$ and $R_{START}$, thus providing the video override feature for display of the synthetic data at a constant refresh rate. That is, as previously mentioned, basic values of $R_{START}$ and $R_{END}$ are first calculated based on no video override. Then, depending on the type of override selected (e.g. long range or short range) revised values $R'_{START}$ and $R'_{END}$ are calculated and employed in the actual display function to provide the time necessary for the synthetic data.

a. SHORT RANGE VIDEO OVERRIDE. Calculate an adjusted $R'_{START}$ as follows, and use $R_{END}$ from above.

$$R'_{START} = R_{START} + (1 - n)\frac{MAX}{\theta}(R_{END} - R_{START})$$

b. LONG RANGE VIDEO OVERRIDE. Calculate an adjusted $R'_{END}$ as follows.

$$R'_{END} = \frac{MAX}{\theta}(R_{START}) + n\left[\frac{MAX}{\theta}(R_{END} - R_{START})\right]$$

E. $T_{WAIT}$ Calculations

This calculation finds the time from early trigger ($T_E$) until the sweep generator must demand the deflection channel. The units for this calculation are in pure time, not the $\Delta R$ clocks used elsewhere.

$$R_{WAIT} = R'_{START} \times \frac{SWEEP\ TIME}{RANGE\ CLOCK} + (T_E\ to\ T_M\ TIME) - \begin{pmatrix} DEFL. \\ SET\ UP \\ TIME \end{pmatrix}$$

Where: ($T_E$ to $T_M$ TIME) is the dead time of timing line 136 in FIG. 6.

$X_{START}$ and $Y_{START}$ Calculations

This calculation generates the presets for the X and Y channel Digital to Analog converters (Digilog) to properly position the CRT beam to the beginning point for sweep.

$$X_{START} = (R'_{START} \times SIN\ \theta) - X_{OFFSET}$$

$$Y_{START} = (R'_{START} \times COS\ \theta) - Y_{OFFSET}$$

The above calculations for the radar display of the invention performed in the microprocessor 46 may be programmed thereon by programming techniques well within the skill of the art and need not be explained in further detail.

Thus, it can be seen that a radar display constructed and operated according to the techniques of the present invention provides the stated objectives of displaying both synthetic and real-time data without the loss of critical data or flickering of the display while, as an attendant benefit, the use of the DELTA R clock based on beam sweep length as opposed to elasped time provides ease in calculation for such functions as offset, range-scale, and sweep off-scale. This is because all of the foregoing functions and others which are dependent upon screen position rather than time can be fixed as to their occurrence on the PPI display by the number of DELTA R clock pulses to their occurrence on a fixed basis rather than involving complex calculations based on range-scales selected vis-a-vis beam generation time and elapsed real-time based clock pulses.

The foregoing techniques find equal applicability in radar systems employing time compression video techniques as well. In such systems, the data from the radar is not displayed in real-time, but rather, is gathered and stored in real-time usually as digital data and subsequently displayed on a time-available basis. When employing the teachings of the present invention with such a system, the DELTA R clocks are used to control the storage of data employing the same techniques as discussed above relative to displaying data except that the DELTA R clock pulses as used in controlling and quantizing the storage of data each represent a fixed distance along the beam of the video record instead of on the display screen. Likewise, the correction methods and apparatus described can be used directly in the display creation regardless of whether the real-time data is displayed directly or stored first by time compression video techniques. The methods and associated apparatus for accomplishing the present invention in systems employing time compression video techniques can be accomplished easily by those skilled in the art by adapting the teachings described heretofore. Accordingly, no additional description is contained herein directed specifically to such systems.

Wherefore, having thus described my invention, I claim:

1. In a radar plan position indicator display wherein data and real-time radar return beams rotating about an origin are displayed by display control circuitry on a time-shared basis, the method of controlling the display creation to prevent both display flicker and lost critical real-time data comprising the steps of:
    (a) selecting the portion of the radar return closest to the origin of the actual radar beam as being either "most critical" or "least critical";
    (b) dividing the time to create the entire real-time radar beam length on the display into a fixed number (L) of equal clock pulses;
    (c) initially allocating the creation of each radar beam on the display a time of said fixed number L of said clock pulses on a priority basis in which to create the radar beam display;
    (d) using only the time not employed in creating the real-time radar beams displayed to create the synthetic data on the display;
    (e) testing the amount of time required for creating the synthetic data on the display against the time remaining following that allocated for creation of the radar beams on the display and, if sufficient, to allow creation of the synthetic data at a refresh rate above that required to prevent flicker, leaving the time in number of clock pulses allocated to create the radar beam on the display at its presently set value and continuing to step (g), otherwise continuing on to step (f);
    (f) when the refresh rate of synthetic data is low enough to cause flicker, reducing the time in number of clock pulses allocated to create the real-time radar beams by a number which represents the added time necessary to refresh the synthetic data on the display at a nonflickering rate, the time being taken at the origin, or at the beam-end end of the radar beams selected directly or indirectly in step (a) as "least critical"; and,
    (g) repeating steps (a)–(f) as necessary in response to changes in designated system conditions.

2. The method of controlling a radar display creation as claimed in claim 1 and additionally comprising the step of:
    reducing the intensity of the real-time radar beam created by a decreasing fixed amount for each of a fixed number of said clock pulses from the origin whereby the sweep pedestal is compensated near the origin for sweep overlap.

3. The method of controlling a radar display creation as claimed in claim 1 and additionally comprising the step of:
    reducing the intensity of the real-time radar beam allocated to a return indication by a decreasing fixed amount for each of a fixed number of said clock pulses from the origin whereby the intensity of returns along the beam length is compensated for sweep overlap.

4. The method of controlling a radar display creation as claimed in claim 1 and additionally comprising the step of:
    using said beam length based clock pulses as the time base in "offset", "range-scale", and "sweep off-scale" functions of the display control.

5. In a radar plan position indicator display having a radar range clock and having a display screen and display logic time-synchronized to a radar beam for creating a light beam on the display screen of a cathode ray tube indicating a portion of the radar beam between the origin and maximum range preselected by a range switch, the improvement comprising:
    a deflection clock circuit connected to provide the time synchronization of the display logic as a function of clock pulses each representing a fixed deflection distance along the beam on the display screen regardless of the maximum range value selected.

6. The improvement to a radar plan position indicator as claimed in claim 5 wherein:
    (a) the light beam on the display rotates about the origin in synchronization with a rotating radar whereby beam overlap occurs adjacent the origin; and wherein said improvement additionally comprises,
    (b) data storage means for holding a preset step series of fixed correction values associated with each respective distance of one of said clock pulses from the origin; and,
    (c) means connected to said clock circuit, said data storage means, and the display for decreasing the intensity of the light beam sequentially from the origin by said correction values whereby intensity distortion from beam overlap is eliminated.

7. The improvement to a radar plan position indicator as claimed in claim 5 wherein:

(a) the display logic is adapted to display both synthetic data and real-time radar return data; and wherein said improvement additionally comprises, (b) control means connected to said display logic and said clock circuit for allocating time available for creating a visual display on the display screen between the creation of synthetic data and real-time radar return data in a manner which minimizes lost real-time radar return data while maximizing the refresh rate of the synthetic data to reduce display flicker thereof, said control means including means for, (b1) selecting the portion of the radar return closest to the origin of the actual radar beam as being either "most critical" or "least critical";

(b2) dividing the time to create the entire real-time radar beam length on the display into a fixed number (L) of equal clock pulses;

(b3) initially allocating the creation of each radar beam on the display a time of said fixed number L of said clock pulses on a priority basis in which to create the display;

(b4) using only the time not employed in creating the real-time radar beam displayed to create the synthetic data on the display;

(b5) testing the amount of time required for creating the synthetic data on the display against the time remaining following that allocated for creation of the radar beams on the display and, if sufficient, to allow creation at a refresh rate above that required to prevent flicker, leaving the time in number of clock pulses allocated to create the radar beam on the display at its presently set value and continuing to step (b7), otherwise continuing on to step (b6);

(b6) when the refresh rate of synthetic data is low enough to cause flicker, reducing the time in number of clock pulses allocated to create the real-time radar beams by a number which represents the added time necessary to refresh the synthetic data on the display at a non-flickering rate, the time being taken at the origin, or at the beam-end end of the radar beams selected directly or indirectly in step (b1) as "least critical"; and, (b7) repeating steps (b1)–(b6) as necessary in response to changes in designated system conditions.

8. The improvement to a radar plan position indicator as claimed in claim 5 wherein said clock circuit includes:

means responsive to the radar range clock and the current value of the range switch for calculating and setting the duration of said clock pulses currently being used by dividing the value of the radar range clock by the ratio of the current range switch setting to the shortest range selection available.

9. The improvement to a radar plan position indicator as claimed in claim 5 wherein the light beam on the display rotates about the origin in synchronization with a rotating radar causing beam overlap to occur adjacent the origin, the cathode ray tube having a sweep unblank line and a video line, and wherein said improvement additionally comprises:

(a) means for generating a composite correction voltage being the summation of a range rate correction voltage and a digital overlap correction voltage;

(b) a first variable gain voltage amplifier, having a control input, connected in series with the sweep upblank line of the cathode ray tube;

(c) a second variable gain voltage amplifier, having a control input, connected in series with the video line of the cathode ray tube; and (d) means for connecting said correction voltage to said control inputs of said voltage amplifiers to maintain a flat field intensity pattern.

10. The improvement to a radar plan position indicator as claimed in claim 9 wherein said composite voltage generating means comprises:

(a) means for selecting a range rate correction value from a set of prestored values as a function of the current setting of the range switch;

(b) means for generating said range rate correction voltage in proportion to said selected range rate correction value;

(c) counter means for counting said clock pulses occurring since the light beam was at its origin;

(d) means for selecting a control value from a set of prestored values as a function of the current value of said counter means;

(e) means for generating said digital overlap correction voltage in proportion to said selected control value; and, (f) a summing voltage amplifier having said range rate correction voltage and said digital overlap correction voltage connected as inputs thereto and producing said composite correction voltage at an output thereof.

11. In a radar plan position indicator display responsive to a radar range clock and having recording logic time synchronized to a radar beam for recording the intensity of the video within a desired display area along the radar beam between the origin and a maximum range preselected by a range switch, the improvement comprising:

(a) a clock circuit connected to provide the time synchronization of the logic as a function of clock pulses each representing a fixed distance along the beam of the video record regardless of the maximum range value selected, and (b) said clock circuit including means responsive to the radar range clock and the current value of the range switch for calculating and setting the duration of said clock pulses currently being used by dividing the value of the radar range clock by the ratio of the current range switch setting to the shortest range selection available.

12. In a radar plan position indicator display having a cathode ray tube and having recording logic time synchronized to a radar beam for recording the intensity of the video within a desired display area along the radar beam between the origin and a maximum range preselected by a range switch, and wherein the light beam on the display rotates about the origin in synchronization with a rotating radar causing beam overlap to occur adjacent the origin, the cathode ray tube having a sweep unblank line and a video line, the improvement comprising:

(a) a clock circuit connected to provide the time synchronization of the logic as a function of clock pulses each representing a fixed distance along the beam of the video record regardless of the maximum range value selected, (b) means for generating a composite correction voltage being the summation of a range rate correction voltage and a digital overlap correction voltage;

(c) a first variable gain voltage amplifier, having a control input, connected in series with the sweep upblank line of the cathode ray tube;

(d) a second variable gain voltage amplifier, having a control input, connected in series with the video line of the cathode ray tube; and (e) means for connecting said correction voltage to said control inputs of said voltage amplifiers to maintain a flat field intensity pattern.

13. The improvement to a radar plan position indicator as claimed in claim 12 wherein said composite voltage generating means comprises:

(a) means for selecting a range rate correction value from a set of prestored values as a function of the current setting of the range switch;

(b) means for generating said range rate correction voltage in proportion to said selected range rate correction value;

(c) counter means for counting said clock pulses occurring since the light beam was at its origin;

(d) means for selecting a control value from a set of prestored values as a function of the current value of said counter means;

(e) means for generating said digital overlap correction voltage in proportion to said selected control value; and, (f) a summing voltage amplifier having said range rate correction voltage and said digital overlap correction voltage connected as inputs thereto and producing said composite correction voltage at an output thereof.

* * * * *